July 31, 1973     R. R. STRINGHAM ET AL     3,749,603
ALKALI METAL/SULFUR BATTERY HAVING A CATHODIC CURRENT
COLLECTOR COATED WITH MOLYBDENUM DISULFIDE
Filed April 17, 1972

_United States Patent Office_

3,749,603
Patented July 31, 1973

3,749,603
ALKALI METAL/SULFUR BATTERY HAVING A CATHODIC CURRENT COLLECTOR COATED WITH MOLYBDENUM DISULFIDE
Robert R. Stringham, Concord, and William H. Taplin III, Lafayette, Calif., assignors to The Dow Chemical Company, Midland, Mich.
Filed Apr. 17, 1972, Ser. No. 244,410
Int. Cl. H01m 35/02
U.S. Cl. 136—6      7 Claims

ABSTRACT OF THE DISCLOSURE

Disclosed is an alkali metal/sulfur battery having as a cathodic current collector a shaped member comprising a substrate to which is adhered a 50 A. to 5000 A. thick coating of molybdenum disulfide. The substrate can be an outer layer or may constitute the entire member and consists essentially of aluminum, magnesium or various alloys containing at least minor amounts of these metals. The electrical resistance of the coated cathode generally drops to a minimum upon being contacted with a molten alkali metal polysulfide for a relatively brief period of time.

BACKGROUND OF THE INVENTION

Figure 1:
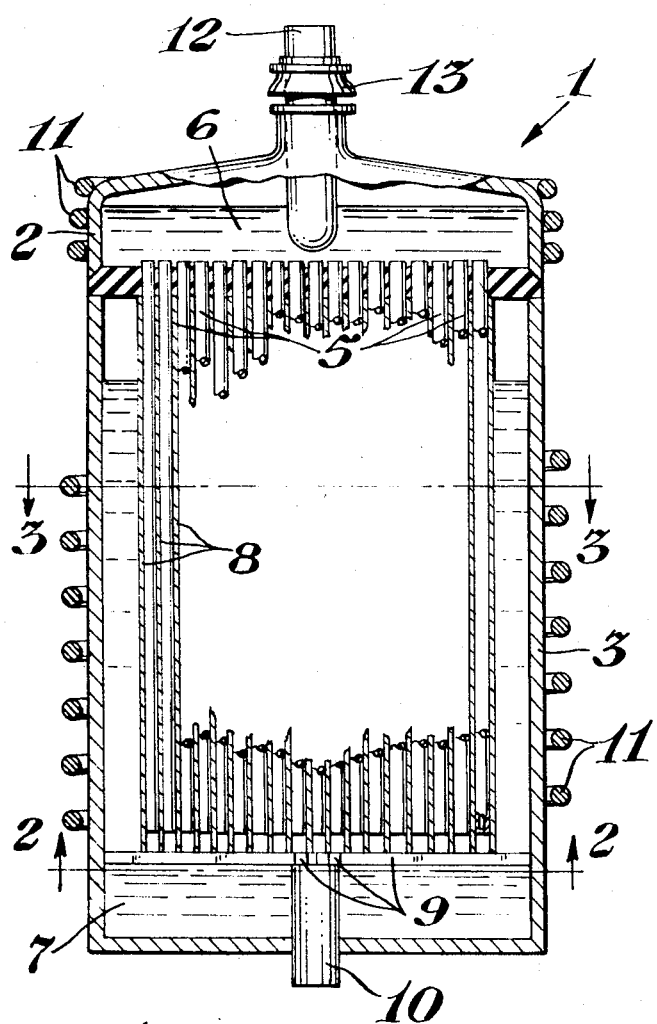

Recent battery technology, such as is disclosed in U.S. Pat. 3,476,602 (incorporated herein by reference) discloses the use of a molten alkali metal anode/anolyte and a molten sulfur/alkali metal sulfide catholyte separated by an alkali metal ion-permeable membrane/electrolyte. A cathodic current collector, or "cathode" is immersed in the catholyte. When the anode and cathode are connected through an external electrical circuit, electrons are discharged to this circuit from the anode with formation of positively charged alkali metal ions. These ions migrate through the membrane into the catholyte. Negatively charged sulfide (polysulfide) ions are formed in the catholyte by interaction of sulfur at the cathode surface with electrons received from the external circuit.

In one embodiment of such a battery, the membrane is in the form of a multiplicity of sodium-filled hollow glass fibers closed at one end and open at the other. The open ends of the fibers communicate with a reservoir of molten sodium and the fibers are immersed in the molten polysulfide catholyte, the anolyte (sodium) and catholyte being separated by a "tube sheet" through which the fibers pass in sealing arrangement. In this embodiment, a large anode area is afforded by closely spacing a large number of the fine hollow fibers in a given cell or battery volume.

To realize the potential high volumetric efficiency (watts/cu. ft.) of such a battery, the large anode area must be matched by an equally large cathode area. Copending application, Ser. No. 70,147, filed Sept. 8, 1970 by William E. Brown and William H. Taplin, incorporated herein by reference, discloses the use as a cathode of a thin aluminum foil interleaved between adjacent rows or layers of the hollow fibers. This provides the requisite high cathode area. A large area can also be provided by using a perforated foil, screening or closely spaced wires, connected to a common terminal. An efficient configuration for the cell (or battery) is obtained by rolling up a parallel array of fibers with the cathode foil (or screen, etc.) in jellyroll fashion.

Minimization of internal electrical resistance is also essential to high volumetric efficiency. Metals such as aluminum, magnesium and certain alloys of these metals not only have low electrical resistivity but are ductile enough to be readily formed into wires or foils and do not melt at the temperatures (250–450° C.) contemplated for operation of alkali metal/sulfur batteries. However, it has been found that upon prolonged exposure to molten polysulfides, cathodes made of these materials tend to increase in resistance to such an extent that a marked decrease in battery efficiency results. Presumably, this is due to formation of surface layers of aluminum sulfide, etc., which have a very low conductivity.

The object of the present invention is to provide an alkali metal/sulfur battery having a high surface area cathode which can be fabricated easily from cheap, readily available metals or alloys but does not show a marked increase in electrical resistance upon exposure to molten alkali metal polysulfides.

SUMMARY OF THE INVENTION

The present invention is an alkali metal/sulfur battery having a shaped metallic cathode member comprising a substrate to which is adhered a coating of molybdenum disulfide (hereinafter referred to simply as "moly") from about 50 A. to about 5000 A. thick. The substrate consists essentially of one of the following:

(a) aluminum
(b) magnesium
(c) aluminum and magnesium
(d) cadmium and at least 1 weight percent magnesium
(e) zinc and at least 10 weight percent magnesium
(f) cadmium, at least 0.5 weight percent magnesium and at least 5 weight percent aluminum
(g) zinc, at least 0.5 weight percent Mg and at least 5.0 weight percent Al
(h) cadmium, zinc and at least 1.0 weight percent magnesium
(i) aluminum, cadmium, zinc and at least 1.0 weight percent magnesium.

If the substrate does not constitute the entire cathode member, the remainder, which is joined to the substrate in electrically conductive contact, consists of a metallic composition which does not melt at temperatures below 200° C., preferably not below 400° C., and does not have a volume resistivity in excess of 10 ohm centimeters at the contemplated temperature of battery operation.

As used above, the term "consisting essentially of" excludes those amounts of other metals which will alter the essential character of the substrate. The essential character of the substrate is such that when a test strip of it is coated with moly to a depth of at least 50 A. and immersed for 60 days in a melt of sodium polysulfide at the contemplated temperature of operation, the strip exhibits an overall resistance to flow of current through it, not in excess of 5.0 ohms per cm.$^2$ of surface exposed to the melt. Also, the strip does not exhibit a rate of corrosion by the melt in excess of 0.05 mil/yr. Most substrates do not melt at 300° C. and a sodium tetrasulfide melt maintained at 300° C. is generally suitable as a "standard" test bath.

DETAILED DESCRIPTION OF THE INVENTION

Cathode element construction

The uncoated cathode member may be fabricated in a variety of shapes and thicknesses from a variety of metals or alloys. It can be homogeneous throughout, may vary in composition from one side to the other or may consist of two or more layers. For example, the member can simply consist of aluminum in the shape of a thin foil, the outermost portion of which functions as the substrate. Alternatively, the substrate may be deposited on the exposed surfaces of a screen of a metal such as copper. As a further example, the cathode member may consist of two or more laminae.

In yet another embodiment, a thin layer of a non-metallic material, such as a tightly woven graphite fabric, can be placed between two foils and the resulting laminae forced into essentially continuous contact, as by passage through a nip between opposed rolls. In the latter embodiment, each of the two foil layers constitutes a cathode member having a single surface to be moly-coated according to the instant invention. Alternatively, a loosely woven graphite fabric can be impregnated and coated with a metal or alloy, as by impregnation with the metal in powder form and fusing under pressure. In this type of composite, the metal coatings on opposite sides of the fabric are joined by the metal disposed in the interstices of the fabric to form a unitary body of metal which constitutes a single cathode member having two surfaces to be coated with moly.

In another embodiment, the interior portion of the casing or cup which holds the catholyte is made of a metal such as aluminum. If the inner surface is coated with moly, the casing can also function as a cathode member despite prolonged contact with the catholyte.

If the moly coating is not applied, the aluminum will react with the catholyte until a passivating sulfide layer having a high resistance is formed and a decrease in the effective cathode surface available will occur. Generally, the percentage of the total cathode area provided by the casing will be quite minor. However, in some designs, as in a battery of elongated tubular configuration, the casing surface can provide a significant portion of the cathode area.

The instant invention has particular utility in connection with alkali metal/sulfur batteries in which the cathode structure consists of one or more members having the form of flexible sheets, such as foils, screens, etc. However, it is also useful for the protection of cathode elements of greater thickness and/or rigidity than foils from corrosion or passivating attack by alkali metal polysulfide melts.

Substrate layer thickness

The minimum thickness of the substrate layer is that which suffices to make the metal under the substrate inaccessible to the catholyte. When the substrate is the subsurface portion of a homogeneously composed cathode member, the depth inwardly from the surface to which the substrate material is involved in the protective mechanism is probably much less than 50 A. However, the member itself will not be less than 50 A. thick. When the substrate is applied, as by dipping, plating, vapor deposition, etc. to an underlying metal, a thickness of at least about 50 A. ensures establishment of a sufficiently impenetrable layer.

Moly layer thickness

The function of the moly layer is not to prevent contact between the substrate and the catholyte. In fact, contact of the sulfide melt with both the substrate and the moly appears to be essential to preventing development of a high surface resistance. 50 A. is about the minimum average thickness of the moly layer it is practicable to apply. The resistivity of the moly per se is much greater than that of the suitable substrate metals and no technical purpose is served by going to layer thicknesses greater than 5000 A.

Composition of cathode portion underlying substrate layer

The portion of the cathode element to which the substrate is adhered can be made of the same material as the substrate, in the same or different proportions, or of a variety of other metal compositions. Any metal or alloy which has a volume resistivity not in excess of 10 ohm cm. and does not melt, at the contemplated temperature of operation (and to which the substrate can be made to adhere in electrically conductive contact) is suitable. Such metal compositions include, for example, copper, nickel, and various alloys of iron, copper, zinc, tin, rhenium, tantalum, titanium, tungsten, vanadium, zirconium, aluminum, magnesium and cadmium.

Application of moly and substrate pre-treatments

The moly coating can be applied to the substrate surface by any of several methods, such as shot peening, burnishing or painting on in a liquid vehicle which can be removed by evaporation or soaking. U.S. Pat. 3,574,658 describes a method in which metal surfaces, such as surfaces of aluminum, can be dry-lubricated by impacting them with peening particles—such as glass microspheres—coated with moly. Alternatively, the metal surface can be covered with moly and peened or burnished, as by rubbing.

A method which has been found particularly suitable is to simultaneously abrade and burnish the foil surface by rubbing it with a fine emery cloth while it is immersed in an aqueous suspension of moly particles obtained by ball-milling commercial moly powder with water. By this method, contact of the metal surface and moly under burnishing pressure is not only provided for, but disruption of surface oxide layers, oil layers, etc., on the metal surface is accomplished. Such oxide and/or oil layers not only have higher electrical resistances but also interfere with moly adherence.

Freshly exposed aluminum surfaces have a very strong tendency to react with oxidants, such as oxygen or sulfur, and it is extremely difficult to avoid formation of at least mono molecular layers of oxide in ordinary handling. By abrasion under water—preferably water which has been deaereated—it is possible to minimize the amount of oxides present. If this is also done in the presence of fine moly particles, a good, adherent moly coating results.

It has also been found that a satisfactory metal substrate surface for coating can be provided, as on commercial foils for example, by baking at 400° C. for a time sufficient to remove any organic matter, such as lubricating oil films. It is not known whether this pretreatment has any effect on oxide layers. However, the baking and/or coating can be carried out in a non-oxidizing or reducing environment if desired.

An alternative pretreatmeint is to contact the substrate surface with a dilute caustic solution (5% aqueous NaOH, for example) for about 10 seconds, with or without concurrent or preliminary mild abrasion.

Operably low resistances are exhibited by cathode elements comprising substrates which have not been pretreated, other than by ordinary cleaning operations. Preferably, however, the substrate surface is pretreated in such a manner as to remove and/or prevent formation of oxides and concurrently or immediately thereafter coated with the moly.

Surface layer resistances

The resistance to flow of current into the cathode element from the catholyte (or vice versa) is of considerable importance. This resistance is independent of the thickness of the cathode element and is only indirectly dependent on the composition of the substrate component. It resides in the thin surface layer, i.e. of metal, oxide, sulfide or whatever between the metal of the substrate proper and the catholyte.

The surface resistance, i.e., the ohms of resistance presented by each cm.$^2$ of surface area, depends on the nature and thickness of this surface layer. If the substrate metal is not coated with moly, the sulfide melt will react with the substrate surface to form a layer of metal sulfide of high resistivity.

If the substrate is coated with moly before being contacted with the sulfide melt, the surface resistance usually shows an initial brief increase, thus indicating penetration through the moly to the substrate metal by one or more catholyte species. However, the resistance generally decreases thereafter, in some instances dropping below the initial value observed. These changes are not dependent on the thickness of the moly coating.

The resistance of a given surface is readily determined in the manner to be described below. It should be noted that this quantity is not divided by the thickness of the surface layer (which is generally quite difficult to determine) and is therefore not a resistivity value. However, it is precisely because it depends *both* on the thickness and resistivity of the surface layer—which in turn depends on the interaction between the substrate surface and the catholyte—that it can be used to characterize the substrate surface (assuming the same catholyte composition is employed with each surface).

Determination of surface resistance

Two test specimens of the substrate material to be charterized are prepared as essentially identical strips of such thinness that the area of edge surface is negligible in comparison to the facial areas. These strips are immersed in a sodium tetrasulfide melt to a depth such that the area of each face in contact with the melt is 5 square centimeters (10 cm.² per specimen). The melt is maintained at 300±5° C. throughout the test. The test strips are spaced apart in the melt about 3 mm. An EMF (0.1 volts, D.C., for example) is applied and an initial current reading made. The circuit is broken and the instantaneous reverse voltage immediately measured in order to determine the back EMF which was being exerted due to concentration polarization while the current was flowing. The initial resistance through the two specimens and the intervening melt is then calculated as $$R = \frac{e_1 - e_2}{i}$$

were $e_1$ is the applied volts, $e_2$ is the back EMF or polarization voltage and $i$ is the current read in amps.

The specimens are maintained in the melt for as long as desired with the polarity of the applied EMF being reversed every thirty minutes. Resistance readings are obtained in the preceding manner at whatever intervals desired. Preferably, air and moisture are excluded from the test system.

Surface resistance values are calculated in units of ohms/cm.² as follows:

$$R_s = \frac{R \times 2}{10}$$

where 2 is the number of the test strips and 10 is the area in cm.² of facial surface immersed in the melt per specimen. Or, more directly, $$R_s = \frac{e_1 - e_2}{5i}$$

ohms/cm.². The error introduced by including the internal resistances of the test specimens and the resistance of the melt between them is quite small and relatively constant and for present purposes can be ignored (so long as the test specimens are closely spaced and are composed of low resistivity metals or are thick enough to have a low internal resistance).

If the substrate composition melts at or below 300°, a lower melting alkali metal sulfide composition will be required. For example, $K_2S_5$ melts at 206° C., $K_2S_4$ at 145° C. and $K_2S_3$ at 252° C.

PREFERRED EMBODIMENTS

A preferred embodiment of the instant invention is an alkali metal/sulfur battery utilizing a plurality of sodium filled hollow glass fibers as the anode/ion-conductive separator and one or more moly-coated, thin metallic foils or gauzes as the cathodic current collector or cathode element. Co-pending application Ser. No. 70,147, referred to earlier herein, includes (pp. 10–16) a detailed description of a method by which batteries of the present invention can be assembled.

The coated foil or gauze is disposed as an array of parallel planes between rows of the fibers in an inverted "nail-bed" arrangement or as concentric wraps between layers of fibers, i.e., in a "jellyroll" configuration. The latter configuration is most preferred in the instant invention.

Highly preferred as cathode elements in the batteries of the present invention are perforate or imperforate foils, from 0.4 to 1.0 mil thick, made of commercially available aluminum or aluminum/magnesium alloys and coated with a layer of molybdenum disulfide from 100 to 1000 A. thick. Such foils have sufficiently low internal (and surface) resistances to accommodate temporary overload currents but are not so thick as to waste space or add unnecessary weight.

Figure 2:
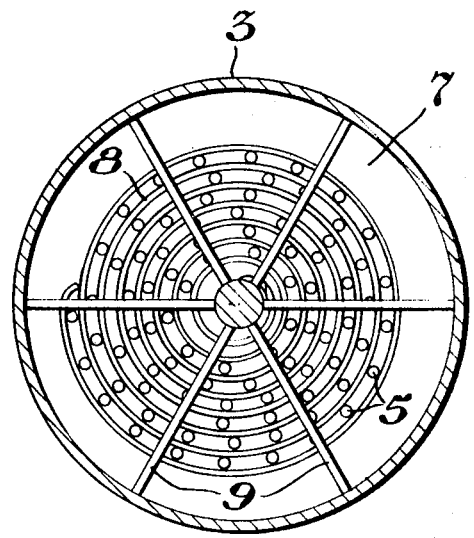

To facilitate understanding of the preferred embodiment of the invention described above, FIGS. 1–4 (depicting this embodiment) will now be described. In FIG. 1, the battery cell (indicated generally by reference number 1) is seen in vertical section and comprises a generally cylindrical anolyte (sodium) reservoir 2 and a generally cylindrical catholyte container 3, both of which are abutted against and joined in sealing arrangement to an intervening, electrically non-conducting "tube sheet" disc 4. A large number of fine hollow glass fiber lengths 5 (a few of which are shown on a greatly exaggerated scale) having their lower ends closed and their upper ends open pass through the tube sheet in sealing arrangement therewith. The open ends of the fibers communicate with the molten sodium 6 in the anolyte reservoir and the portions of the fibers below the tube sheet are immersed in a sodium polysulfide melt 7 held in the catholyte container. The fiber lengths are disposed generally parallel to each other in a continuous spiral of generally concentric vertical rows and constitute a generally cylindrical bundle. Disposed between the rows of fiber lengths within the bundle and wrapped around the bundle at least once is a cathode member 8. The latter consists of a thin, flexible elongated sheet of a metal or metal alloy, such as aluminum and is coated with at least enough molybdenum disulfide to prevent formation of a surface layer exhibiting a surface resistance in excess of 5 ohms/cm.² after the battery has been in operation for 6 months or more. The elongated sheet is wider than the fibers are long and extends vertically from just below the tube sheet to below the closed ends of the fibers. It is joined at a number of places along its lower edge to a horizontal current collector/distributor means 9 which extends radially outward from a central connection to the cathode terminal post 10, as shown in FIGS. 1 and 2.

Figure 3:
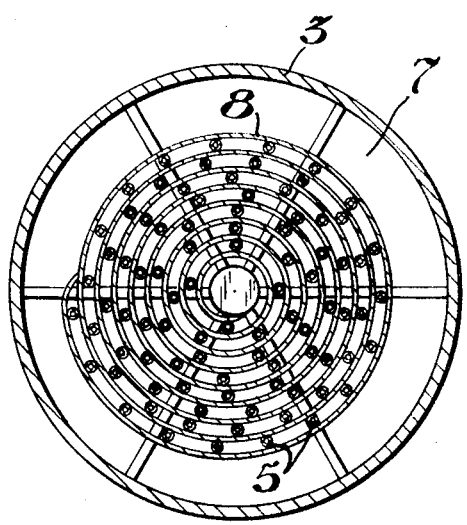
Figure 4:
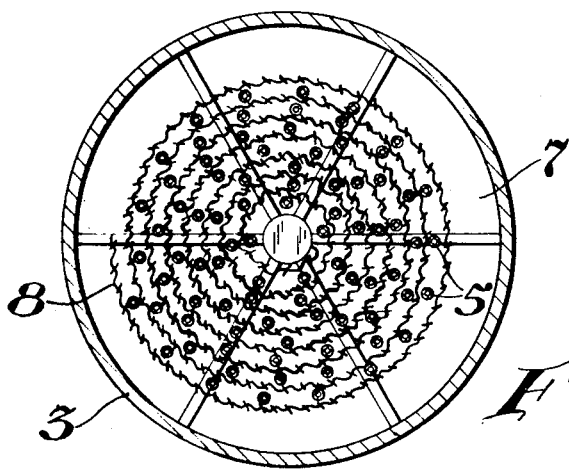

FIG. 3 shows an end-on view of the "jellyroll" arrangement of the fibers 5 and cathode member 8. FIG. 4 depicts the same view of an alternative embodiment in which the sheet which constitutes the cathode member 8 is a perforated foil or a gauze.

Returning to FIG. 1, the battery cell is provided with external electrical resistance heaters, 11, and with an anode terminal post 12 which passes in sealing arrangement through a neck 13 into the sodium 6 in the anolyte reservoir 2.

In actual use, the battery cell is surrounded by insulation and placed in an external casing made of steel or other suitable material.

Although not illustrated, the cathodic terminal post 10 can be a hub portion of a metallic core or mandrel about which the jellyroll of fibers and foil is wrapped up prior to potting the fibers in the tube-sheet material. In the embodiment shown in FIGS. 1–4, the mandrel has been removed and the terminal post is a separate member.

SPECIFIC EMBODIMENTS

Except as otherwise indicated, the test procedure employed is as follows. Two test specimens are prepared by cutting in half a ⁵⁄₁₆" wide x 3" long strip of the sheeting or foil. After any pretreatment specified, these are bolted onto stainless steel lead-in wires, spaced apart by a ⅛" thick glass bar at their upper ends and inserted in a test tube. The tube is filled with sodium tetrasulfide in a dry box and placed in a heating block while connected to a low pressure purge of dry nitrogen gas. When the sulfide melts, the position of the strips is adjusted, if necessary, so that 10 cm.$^2$ of surface on each strip is in contact with the melt. A temperature of about 300° is maintained. A test voltage of 100 millivolts D.C. is applied, with the polarity being reversed automatically at half hour intervals. The surface resistance exhibited after any interval of test duration is determined as described earlier herein.

The compositions of exemplary commercial alloys suitable for use as substrates in the present invention are given in Table I.

TABLE I

| Alloy | Percentage by weight composition | | | | | | | | |
|---|---|---|---|---|---|---|---|---|---|
| | Si | Fe | Cu | Mn | Mg | Cr | Zn | Ni | Al |
| 53S | 0.7 | | | | 1.25 | 0.25 | | | Remainder. |
| 1100 | 1.0 | | | | | | | | Do. |
| 5005 | 0.4 | 0.7 | 0.2 | 0.2 | 0.8 | 0.1 | 0.25 | | Do. |
| 5052 | 0.45 | | 0.1 | 0.1 | 2.5 | 0.25 | 0.1 | | Do. |
| A-214 | | | | | 3.8 | | 2.0 | | Do. |
| 5056 | 0.3 | 0.4 | 0.1 | 0.1 | 5.0 | 0.15 | 0.1 | 2.25 | Do. |
| ASTM VIII | 1.0 | | 1.5 | | | | | 2.25 | Do. |
| 6061 | 0.6 | 0.7 | 0.25 | 0.15 | 1.0 | 0.2 | 0.25 | | Do. |

EXAMPLE 1

Test strips of 1 mil thick 1100 aluminum alloy foil are scrubbed with 5% aqueous caustic, rinsed, dried and tested in the manner described above.

| Duration of test | Volts | | Current in milliamps | Temp., °C. | $R_s = \frac{e_1-e_2}{5i}$ Ω/cm.$^2$ |
|---|---|---|---|---|---|
| | Applied ($e_1$) | Back EMF ($e_2$) | | | |
| 0 hours | 0.1 | 0.05 | 2.0 | 304 | 5 |
| 19 hours | 0.1 | 0.05 | 0.01 | 304 | 1,000 |
| 8 days | 0.1 | 0.05 | 0.01 | 304 | 1,000 |

NOTE.—i is current in amperes, not milliamps.

EXAMPLE 2

The test of Example 1 is repeated, except that immediately after caustic washing and rinsing the test strips are given a coating of molybdenum disulfide about 5000 A. thick. This is done by rubbing each test strip with fine emery cloth under the surface of an aqueous dispersion formed by ball-milling moly powder with water for 70 hours, then drying.

| Test duration | Voltages | | Current in milliamps | Temp., °C. | $R_s = \frac{e_1-e_2}{5i}$ Ω/cm.$^2$ |
|---|---|---|---|---|---|
| | $e_1$ | $e_2$ | | | |
| 0 hours | 0.1 | 0.07 | 5.0 | 298 | 1.2 |
| 6.5 hours | 0.1 | 0.08 | 6.5 | 298 | 0.60 |
| 23 hours | 0.1 | 0.075 | 5.0 | 298 | 0.98 |
| 2 days | 0.1 | 0.080 | 4.5 | 298 | 0.88 |
| 6 days | 0.1 | 0.085 | 3.5 | 298 | 0.86 |
| 31 days | 0.1 | 0.070 | 4.5 | 298 | 1.3 |
| 210 days | 0.1 | 0.060 | 2.0 | 298 | 4.0 |
| 262 days | 0.1 | 0.070 | 0.65 | 298 | 8.1 |

NOTES.—i is current in amperes. Test tube not sealed from air.

EXAMPLE 3

The test of Example 2 is repeated, except that current is passed through the test strips only during surface resistance readings.

| Test duration | Voltages | | Current in milliamps | Temp., °C. | $R_s = \frac{e_1-e_2}{5i}$ Ω/cm.$^2$ |
|---|---|---|---|---|---|
| | $e_1$ | $e_2$ | | | |
| 0 hours | 0.1 | 0.060 | 7.0 | 298 | 1.14 |
| 6.5 hours | 0.1 | 0.070 | 8.0 | 298 | 0.76 |
| 23 hours | 0.1 | 0.065 | 8.5 | 298 | 0.80 |
| 2 days | 0.1 | 0.070 | 8.5 | 298 | 0.70 |
| 6 days | 0.1 | 0.075 | 6.0 | 298 | 0.80 |
| 13 days | 0.1 | 0.070 | 5.0 | 298 | 1.20 |
| 210 days | 0.1 | 0.060 | 3.0 | 298 | 2.8 |
| 262 days | 0.1 | 0.080 | 1.0 | 298 | 4.0 |

NOTES.—i is current in amperes. Test tube not sealed from air.

EXAMPLE 4

Test specimens prepared from essentially pure magnesium foil, 10 mils thick, are baked 5 minutes at 400° C. and then tested in the manner of Example 1. The initial surface resistance is found to be 3000 ohms/cm.$^2$. After 7 days test duration the surface resistance has increased to 4700 ohms/cm.$^2$ and the test is discontinued. Otherwise identical test strips coated with a 100 A. thick layer of moly by burnishing and tested as in Example 2 exhibits a surface resistance of less than 3 ohms/cm.$^2$ after a test duration of 12 months (test cell sealed from air).

EXAMPLE 5

Cathode members according to the instant invention are prepared as follows:

(a) Brass shim stock, 1 mil thick, is vacuum coated on both sides with aluminum, then with aluminum admixed with successively higher contents of magnesium and finally with pure magnesium to a total thickness of 1.8 mils. The plated stock is then coated with a colloidal dispersion of moly in kerosene and the kerosene evaporated in vacuo.

(b) A woven gauze made from 2 mil A–214 Al/Mg/Zn alloy wire and having 225 openings per square inch is immersed in 5% aqueous NaOH at room temperature for about 10 seconds, rinsed with a water spray and passed through a stirred aqueous dispersion of moly (prepared as in Example 1). The strips are dried under gradually reduced pressure to leave on the wire surfaces a coating of moly about 2500 A. thick.

(c) A clean mild steel plate, 125 mils thick, is coated by hot dipping in a molten alloy of aluminum with 1.25% manganese, according to the method of U.S. Pat. 3,639,107. The plate is then rubbed with powdered moly which has been ball-milled with water for 70 hours and recovered by evaporating the water.

EXAMPLE 6

Cathode members of the instant invention and suitable for use in a potassium/sulfur battery wherein potassium pentasulfide ($K_2S_5$) is employed as the catholyte at a temperature of 240° C. are prepared as in Example 2.

| Alloy | Composition, percent | | | |
|---|---|---|---|---|
| | Al | Mg | Cd | Zinc |
| T-2, M.P.~250° C | 22.0 | 2.0 | | 75.0 |
| T-3, M.P.>260° <280° | | 3.0 | 70.0 | 27.0 |

EXAMPLE 7

A battery of the type illustrated in FIGS. 1–4 is assembled and sealed from air in the manner described in the above referred-to co-pending application Ser. No. 70,147.

The cathode member is a foil of aluminum/magnesium alloy #5056 (see Table I preceding) 0.7 mil thick and coated with a 1000 A. layer of molybdenum disulfide applied in the manner described in Example 1. The anolyte is sodium and the catholyte, as charged, is composed of a mixture of sulfur and sodium sulfide, ($Na_2S$) equivalent to $Na_2S_5$. The fibers are composed of an amorphous glass consisting essentially of sodium borate and sodium trisilicate, more particularly described in co-pending application Ser. No. 78,201, filed Oct. 5, 1970 in the names of C. A. Levine and H. M. Garfinkel as inventors. The tube sheet consists of a ceramicized organosilicate composition more particularly described in application Ser. No. 70,532 filed Sept. 8, 1970 in the name of F. Y. Tsang as inventor. About 4000 fibers, 10 centimeters long x 100 microns O.D., 50 microns I.D. are employed at a spacing of about 100 fibers per inch of length of the foil used as the cathode member.

To initiate operation of the battery, the external heating coils are used to bring it to a temperature of 300° C. and an external load is connected to the terminal posts. The cell has an internal resistance of about 0.2 ohm and an initial open circuit voltage of 2.1 volts. When the load on the cell is 1 ampere, the closed circuit voltage is 1.9 volts. When enough sodium is consumed to alter the catholyte composition to $Na_2S_{3.5}$, the open circuit voltage has dropped to 1.9 volts and the closed circuit voltage is 1.7 volts with a 1 ampere load. At this point, current generation is stopped and a reverse EMF applied for 4 hours to recharge the cell to an open circuit voltage of 2.1 volts. The preceding discharge-charge cycle is repeated continuously for 6 months. At the end of this period the internal resistance of the cell is less than 1 ohm. The effective surface area of the cathode element is about $$2\left(\frac{4000}{100} \times 2.54 \times 10\right)$$

or about 2032 cm.² Thus, even if all of the internal resistance of the cell is attributed to surface resistance, the value of $$R_s \left(=\frac{1}{2032}\right)$$

is less than 0.0005 ohm./cm.²

We claim:

1. In an alkali metal/sulfur battery, the improvement in which said battery includes a shaped, metallic cathode member comprising a substrate to which is adhered a coating of molybdenum disulfide,
said coating being from about 50 A. to 5000 A. thick and,
said substrate consisting essentially of one of the following:
   (a) aluminum;
   (b) magnesium;
   (c) aluminum and magnesium;
   (d) cadmium and at least 1 weight percent magnesium;
   (e) zinc and at least 10 weight percent magnesium;
   (f) cadmium, at least 0.5 weight percent magnesium and at least 5.0 weight percent aluminum;
   (g) zinc, at least 0.5 weight percent magnesium and at least 5.0 weight percent aluminum;
   (h) cadmium, zinc and at least 1.0 weight percent magnesium; or
   (i) aluminum, cadmium, zinc and at least 1.0 weight percent magnesium.

2. The battery of claim 1 in which the cathode member is a thin, flexible sheet.

3. The battery of claim 2 in which the cathode member is a foil.

4. The battery of claim 2 in which the cathode member is a gauze.

5. The battery of claim 1 in which the alkali metal is selected from the group consisting of sodium, potassium and lithium.

6. The battery of claim 2 in which the alkali metal is contained in an anolyte reservoir and in a plurality of generally parallel hollow fiber lengths, each of which communicates with said reservoir at an open end, has a closed end immersed in an alkali metal polysulfide catholyte and passes through, in sealing relationship with, a tube sheet member proximal to the open ends of the fiber lengths and which separates the anolyte in the reservoir from the catholyte, said fiber lengths being composed of a glass conductive to cations of said alkali metal and being arranged in successive layers or rows, between which said sheet is disposed in a closely spaced relationship.

7. The battery of claim 6 in which the alkali metal is selected from the group consisting of sodium, potassium or lithium.

References Cited
UNITED STATES PATENTS

| | | | |
|---|---|---|---|
| 3,413,150 | 11/1968 | Kummer et al. | 136—6 F S |
| 3,574,658 | 4/1971 | Fulk et al. | 117—127 |
| 3,658,572 | 4/1972 | Chu | 117—127 |
| 2,854,597 | 9/1958 | Foote et al. | 117—230 |

ALLEN B. CURTIS, Primary Examiner

C. F. LE FEVOUR, Assistant Examiner

U.S. Cl. X.R.

136—100 R